July 3, 1962  C. J. LASZLO  3,041,772
FISH LURE
Filed May 2, 1958

INVENTOR.
CHARLES J. LASZLO
BY
Oberlin & Limbach
ATTORNEYS

3,041,772
FISH LURE
Charles J. Laszlo, 3135 E. 93rd St., Cleveland, Ohio
Filed May 2, 1958, Ser. No. 732,509
1 Claim. (Cl. 43—42.06)

This invention relates to fish lures and, more particularly, to an improved lure of the type adapted to approximate the movement of a minnow or chub, depending on the size of the lure, when drawn through the water.

It is an object of the invention to provide such a lure having a downward planing or diving action in water and a passage therethrough of such formation that the flow through the same is utilized to produce the desired pattern of movement.

Another object is to provide a hollow lure in which the cross-sectional area of the passageway varies in size and shape in such manner as to produce back pressure or drag in pulling the lure through the water, this drag being created primarily at a region fairly close to the discharge end of the lure.

A further object of the invention is to provide a hollow lure having a particular tail or rear end formation effective to preclude rotation of the lure but not advantageous twisting of the same.

It is a further object to provide a lure having the structural and operational characteristics set forth which may conveniently and inexpensively be produced.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

Figure 1:
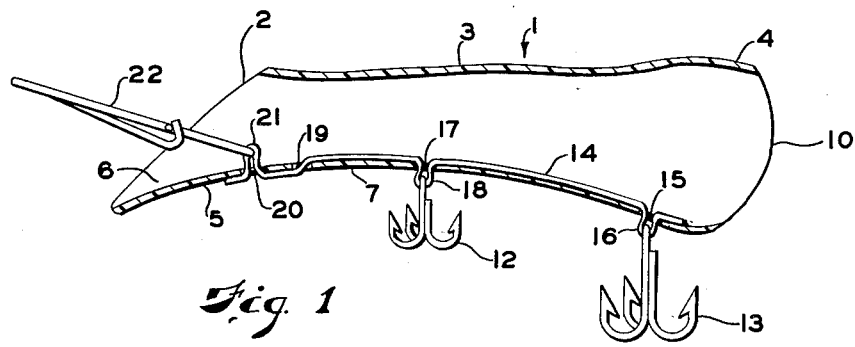
FIG. 1 is a longitudinal section of a lure made in accordance with the invention.

Referring now to the drawing in detail, it will first be seen that the lure comprises a hollow body, generally designated by reference numeral 1, in the nature of a tube shaped or deformed to provide distinct mouth, body and tail portions indicated at 2, 3 and 4, respectively. As a matter of fact, it is preferred that the lure be made from a length of moldable synthetic plastic tubing, such as polyethylene tubing, although other materials, e.g. light metals, could also be used.

Figure 2:
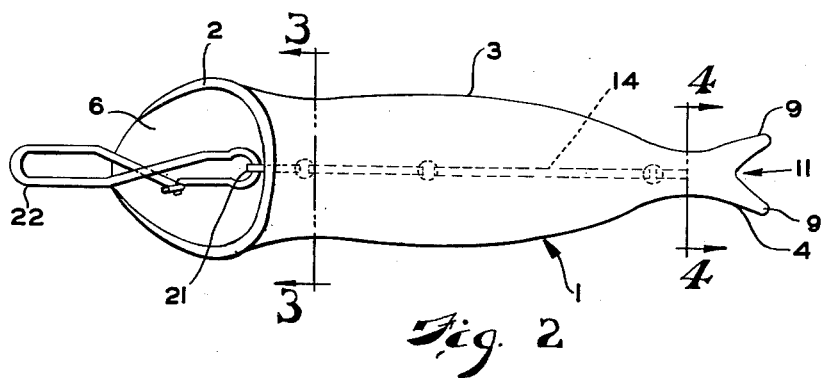
FIG. 2 is a top plan view thereof.
Figure 3:
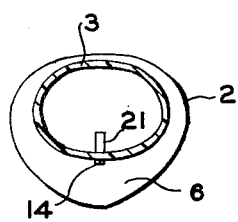
FIG. 3 is a transverse section as viewed from the plane of the line 3—3 in FIG. 2.

The mouth or front opening lies in a rearwardly sloping plane, in relation to a horizontal plane including the longitudinal axis of the lure, and the bottom section 5 of the wall adjacent such end is extended downwardly so that the opening is enlarged and of the shape shown most clearly in FIG. 2. Immediately behind the mouth portion 2, the body 3 is of elliptical cross-section, with its major axis horizontal as illustrated in FIG. 3, and the transformation from the enlarged end opening to such section provides a smoothly rounded downwardly directed lip 6 in the noted angular relation to the body axis. By virtue of this formation, it will be clear that the lure has a tendency to dive or plane downwardly when pulled through the water.

Figure 4:
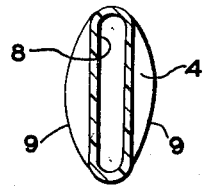
FIG. 4 is a further transverse section view from the plane of the line 4—4 in FIG. 2.

The major body portion 3 is of elliptical shape, with the bottom surface being slightly arched or bowed upwardly as illustrated at 7. At just over one-half the overall length of the lure, and proceeding rearwardly, this portion becomes smaller in its lateral dimension, with a corresponding vertical elongation, until it reaches a section of minimum width and area shown by FIG. 4. As such section, the body has therefore been smoothly transformed to a generally rectangular, vertically oriented throat 8, having the effect of producing back-pressure or drag.

Continuing rearwardly to the tail portion 4, the same comprises two lips 9 respectively curved outwardly and being rounded at their outer edges 10. Such lips of course proceed from the throat 8 and are therefore likewise vertically oriented. Furthermore, the lips are enlarged vertically, with the major portion of this enlargement being downward with respect to the main body portion, so that the top of the lure is substantially straight, while the bottom surface is upwardly bowed from one extremity to the other. The lips of course bound and define the discharge opening 11 of the lure, and the area of the passageway increases gradually from the region of the throat to such discharge opening.

Hooks in any suitable number and grouping are secured to trail from the underside of the lure, and in the embodiment illustrated, I have shown two conventional groups 12 and 13, the first being approximately midway between the ends of the lure and the second close to the trailing end. These hooks are connected to the lure by means of a continuous metal strap 14 which, commencing at the tail and proceeding forwardly, overlies the inner surface along the central bottom portion of the body and is deformed outwardly through a hole 15 near the tail to form a first attaching eye or bight 16. The strap then continues interiorly forwardly to another opening 17 in the wall and is there similarly deformed outwardly to provide a second eye 18, the hook groups 12 and 13 being attached to the eyes 16 and 18. From this point the strap proceeds to a hole 19 through which it is passed to overlie the outer surface of the body for a short distance and it is then bent upwardly through a last hole 20 to form an inner eye 21 adjacent the mouth 2. The line may be attached to eye 21 in suitable manner, a wire clip 22 being illustrated as used for such purpose.

The tendency of the lure to dive in operation, by virtue of the downwardly directed mouth has already been mentioned. In addition, the flow of water both through the hollow body of the lure and over the outer surfaces of the same produces a substantial wobble or oscillation from one side to the other of the line of advance, with this action being more noticeable at the front and dampened somewhat by the tail formation which also, also as previously noted, has a stabilizing effect to preclude rotation. There is, however, some twisting of the tail about the axis, and the sum of all such movements closely simulates the motion in water of small fish, such as a minnow or chub.

It will be noted that the throat is located relatively near the discharge end, preferably at least three-fourths of the over-all length to the rear, and that the drag created at this region by the rush of the water through the lure builds up substantially uniformly in the forward section of the lure. This last characteristic, significant to the action of the lure, results from the smooth transition in the cross-section of the body forwardly to the enlarged mouth.

Suitable coloring and marking will be provided by painting, and if the lure is smaller, or larger, the arrangement of hooks may obviously be varied as appropriate.

Other modes of applying the principle of the invention may be employed, change being made as regards the details described, provided the features stated in the following claim or the equivalent of such be employed.

I, therefore, particularly point out and distinctly claim as my invention:

A fish lure comprising an elongated tubular body having a series of longitudinally spaced holes in the bottom surface thereof, and a continuous metal strap having oppositely facing eyes formed in the same in spaced relation intermediate the strap ends, said strap between such eyes passing through an intermediate hole in the body, with one eye projecting through another hole interiorly for line connection and the other eye inserted through a further hole exteriorly for attachment of a hook thereto, said strap thus lying along the exterior of said bottom surface adjacent said interiorly projecting eye and along the interior of said bottom surface adjacent said exteriorly projecting eye.

References Cited in the file of this patent

UNITED STATES PATENTS

| | | |
|---|---|---|
| 1,812,235 | Carr | June 30, 1931 |
| 1,951,626 | Pashley | Mar. 20, 1934 |
| 2,172,889 | Niemi | Sept. 13, 1939 |
| 2,556,683 | Deitz | June 12, 1951 |
| 2,556,702 | Nielsen | June 12, 1951 |
| 2,560,733 | Morris | July 17, 1951 |
| 2,569,465 | Farr | Oct. 2, 1951 |
| 2,600,437 | Siepe | June 17, 1952 |
| 2,630,648 | Powell | Mar. 10, 1953 |
| 2,644,265 | Stettner | July 7, 1953 |
| 2,694,876 | Grasser | Nov. 23, 1954 |
| 2,871,609 | Noches | Feb. 3, 1959 |

FOREIGN PATENTS

| | | |
|---|---|---|
| 9,829 | Great Britain | Apr. 30, 1903 |